US012671225B2

(12) United States Patent
Srinivasan et al.

(10) Patent No.: US 12,671,225 B2
(45) Date of Patent: Jun. 30, 2026

(54) LASER SYSTEM WITH ACTIVE WAVELENGTH CONTROL

(71) Applicant: Lightmatter, Inc., Boston, MA (US)

(72) Inventors: Srinivasan Ashwyn Srinivasan, Toronto (CA); Jessie Rosenberg, Bedford, MA (US); Krishna Bharath, Portland, OR (US); Matthew D. Cole, South Boston, MA (US); Stefan Pfnuer, Scotts Valley, CA (US); Binoy Shah, Niskayuna, NY (US); Dapeng Liu, Santa Clara, CA (US); Stanley W. Hsu, Cupertino, CA (US)

(73) Assignee: Lightmatter, Inc., Mountain View, CA (US)

( * ) Notice: Subject to any disclaimer, the term of this patent is extended or adjusted under 35 U.S.C. 154(b) by 0 days.

(21) Appl. No.: 19/339,921

(22) Filed: Sep. 25, 2025

(65) Prior Publication Data

US 2026/0095014 A1 Apr. 2, 2026

Related U.S. Application Data

(60) Provisional application No. 63/700,596, filed on Sep. 27, 2024.

(51) Int. Cl.
*H04B 10/04* (2006.01)
*G02B 6/293* (2006.01)
(Continued)

(52) U.S. Cl.
CPC .......... *H01S 3/1305* (2013.01); *G02B 6/2938* (2013.01); *H01S 3/0405* (2013.01); *H01S 3/06704* (2013.01); *H01S 3/23* (2013.01)

(58) Field of Classification Search
CPC .... H04B 10/40; H04B 10/572; H04B 10/564; H04B 10/50575; H04B 10/0795;
(Continued)

(56) References Cited

U.S. PATENT DOCUMENTS 5,883,743 A 3/1999 Sloan
9,148,226 B2 * 9/2015 Sato ....................... H04B 10/40
(Continued)

OTHER PUBLICATIONS

International Search Report and Written Opinion dated Mar. 23, 2026, in connection with International Application No. PCT/US2025/047894.
Invitation to Pay Additional Fees dated Jan. 29, 2026, in connection with International Application No. PCT/US2025/047894.

*Primary Examiner* — Hanh Phan
(74) *Attorney, Agent, or Firm* — Wolf, Greenfield & Sacks, P.C.

(57) ABSTRACT

Described herein are packages and techniques aimed at stabilizing the wavelengths of emission of a wavelength division multiplexing (WDM) optical source against temperature fluctuations. An optical source is coupled with a feedback loop that monitors the degree to which the wavelengths of emission conform to the designated WDM channel grid and dynamically adjusts the operating parameters of the source to maintain such conformity. The technique involves a combination of coarse spectral alignment and fine spectral alignment. An optical source uses a pair of thermoelectric coolers (TEC) to aid in the spectral alignment process. A first TEC is thermally coupled to a laser chip. A second TEC is thermally coupled to a multiplexer chip—a chip that monitors compliance of the emission wavelengths with the designated WDM grid.

20 Claims, 14 Drawing Sheets

(51) Int. Cl.

| | |
|---|---|
| *H01S 3/04* | (2006.01) |
| *H01S 3/067* | (2006.01) |
| *H01S 3/13* | (2006.01) |
| *H01S 3/23* | (2006.01) |

(58) Field of Classification Search

CPC .......... H04B 10/50595; H04B 10/5057; H04B 10/671; H04B 10/672; H04B 10/503; H04B 10/506; H04J 14/02; H04J 14/0227; H01S 3/06704; H01S 3/1305; H01S 3/0405; G02B 6/4246; G02B 6/4292

USPC ......... 398/79, 162, 183, 193, 194, 195, 196, 398/197, 198, 199, 200, 201, 33, 38, 25, 398/26, 27, 158, 159, 95, 93, 94, 135, 398/136; 372/20, 32, 34, 36, 38.02; 385/88, 89, 90, 92, 93

See application file for complete search history.

(56) References Cited

U.S. PATENT DOCUMENTS

| | | | | |
|---|---|---|---|---|
| 9,577,757 | B2 * | 2/2017 | Oomori .................. | H04B 10/40 |
| 2005/0286909 | A1 * | 12/2005 | Kish ...................... | H04B 10/50 |
| | | | | 398/196 |
| 2009/0202196 | A1 | 8/2009 | Kish et al. | |
| 2010/0165432 | A1 | 7/2010 | Laycock et al. | |
| 2010/0183307 | A1 * | 7/2010 | Matsumoto .......... | H04B 10/506 |
| | | | | 398/79 |
| 2012/0195593 | A1 | 8/2012 | Bernasconi et al. | |
| 2014/0119393 | A1 | 5/2014 | Schleuning et al. | |
| 2017/0227724 | A1 | 8/2017 | Yamaji et al. | |
| 2018/0138981 | A1 * | 5/2018 | Butrie .................. | H04B 10/503 |
| 2019/0339065 | A1 | 11/2019 | Nguyen et al. | |
| 2021/0173238 | A1 | 6/2021 | Hosseinzadeh et al. | |

* cited by examiner

Mux chip 154

Wire bonds 195

Mux chip 154

LASER SYSTEM WITH ACTIVE WAVELENGTH CONTROL

CROSS-REFERENCE TO RELATED APPLICATION

This application claims the benefit of U.S. Provisional Application Ser. No. 63/700,596, filed on Sep. 27, 2024, and entitled "LASER SYSTEM WITH ACTIVE WAVELENGTH CONTROL," which is hereby incorporated herein by reference in its entirety.

BACKGROUND

Photonic integrated circuits (PICs) are increasingly used in optical communication systems to achieve high-speed data transmission with compact form factors and improved energy efficiency. A critical component in PIC-based systems is the laser source, which provides the optical carrier signal for data modulation.

Laser sources can be realized in a variety of semiconductor platforms, each offering distinct advantages for integration into photonic systems. Common characteristics of laser sources include the ability to deliver coherent light with narrow spectral linewidths, stable output power and long operational lifetimes. Depending on the application, a laser source may be designed to support single-mode emission and efficient coupling to on-chip waveguides, thereby ensuring reliable operation with photonic systems.

BRIEF SUMMARY

In some aspects, the techniques described herein relate to a wavelength division multiplexing (WDM) optical source, including: a support; a first thermo-electric cooler (TEC) and a second TEC, wherein the first and second TECs are mounted on the support; a first chip including a tunable laser array, wherein the first chip is thermally coupled to the first TEC; and a second chip including an optical multiplexer, wherein the second chip is thermally coupled to the second TEC, wherein the tunable laser array is optically coupled to the optical multiplexer.

In some aspects, the techniques described herein relate to a WDM optical source, wherein the second chip further includes an optical demultiplexer, an output of the optical multiplexer being optically coupled to an input of the optical demultiplexer.

In some aspects, the techniques described herein relate to a WDM optical source, further including a photodetector array coupled to outputs of the optical demultiplexer.

In some aspects, the techniques described herein relate to a WDM optical source, further including a first temperature sensor thermally coupled to the first TEC and a second temperature sensor thermally coupled to the second TEC.

In some aspects, the techniques described herein relate to a WDM optical source, further including: a first temperature sensor thermally coupled to the second TEC; a first photodetector array optically coupled to the first chip and a second photodetector array optically coupled to the second chip; and a controller configured to: control the second TEC using a first signal generated by the first temperature sensor; control the first TEC using a second signal generated by the first photodetector array and a third signal generated by the second photodetector array; and subsequent to controlling the first TEC and the second TEC, controlling the tunable laser array based on a fourth signal generated by the second photodetector array.

In some aspects, the techniques described herein relate to a WDM optical source, further including a second temperature sensor thermally coupled to the first TEC, wherein controlling the first TEC is further performed using a fifth signal generated by the second temperature sensor.

In some aspects, the techniques described herein relate to a WDM optical source, wherein the first and second TECs share a common TEC plate.

In some aspects, the techniques described herein relate to a WDM optical source, wherein the common TEC plate is a bottom plate mounted to the support, wherein the first TEC includes a first top plate and the second TEC includes a second top plate, wherein the first chip is mounted to the first top plate and the second chip is mounted to the second top plate.

In some aspects, the techniques described herein relate to a WDM optical source, wherein the second chip includes a planar lightwave circuit (PLC) and the optical multiplexer is made of silicon dioxide.

In some aspects, the techniques described herein relate to a WDM optical source, wherein the tunable laser array is optically coupled to the optical multiplexer through an isolator array.

In some aspects, the techniques described herein relate to a wavelength division multiplexing (WDM) optical source, including: a support; a first chip including a tunable laser array, wherein the first chip is mounted to the support; a second chip including an optical multiplexer, wherein the second chip is mounted to the support, wherein the tunable laser array is optically coupled to the optical multiplexer; and a controller coupled to the first and second chips, wherein the controller is configured to: perform coarse spectral alignment between the tunable laser array and the optical multiplexer, and subsequent to performing the coarse spectral alignment, perform fine spectral alignment between the tunable laser array and the optical multiplexer.

In some aspects, the techniques described herein relate to a WDM optical source, wherein performing the coarse spectral alignment includes: setting a temperature at which the optical multiplexer operates, applying a collective bias to the tunable laser array, and setting a temperature at which the tunable laser array operates.

In some aspects, the techniques described herein relate to a WDM optical source, wherein setting the temperature at which the tunable laser array operates includes setting the temperature at which each tunable laser of the tunable laser array at least partially overlaps with a respective passband of the optical multiplexer.

In some aspects, the techniques described herein relate to a WDM optical source, wherein setting the temperature at which each tunable laser of the tunable laser array at least partially overlaps with a respective passband of the optical multiplexer is performed using: a first signal generated by a first photodetector array optically coupled to the tunable laser array, and a second signal generated by a second photodetector array optically coupled to the optical multiplexer.

In some aspects, the techniques described herein relate to a WDM optical source, wherein: setting the temperature at which the optical multiplexer operates includes controlling a first thermo-electric cooler (TEC) thermally coupled to the optical multiplexer, and setting the temperature at which the tunable laser array operates includes controlling a second TEC thermally coupled to the tunable laser array.

In some aspects, the techniques described herein relate to a WDM optical source, wherein performing the fine spectral alignment includes individually varying biases applied to tunable lasers of the tunable laser array from the collective bias.

In some aspects, the techniques described herein relate to a WDM optical source, wherein the second chip further includes: an optical demultiplexer, an output of the optical multiplexer being optically coupled to an input of the optical demultiplexer; and a photodetector array coupled to outputs of the optical demultiplexer.

In some aspects, the techniques described herein relate to a method for controlling a wavelength division multiplexing (WDM) optical source, the method including: performing coarse spectral alignment between a tunable laser array and an optical multiplexer, wherein performing the coarse spectral alignment includes: setting a temperature at which the optical multiplexer operates, applying a collective bias to the tunable laser array, and setting a temperature at which the tunable laser array operates; and subsequent to performing the coarse spectral alignment, performing fine spectral alignment between the tunable laser array and the optical multiplexer, wherein performing the fine spectral alignment includes individually varying biases applied to tunable lasers of the tunable laser array from the collective bias.

In some aspects, the techniques described herein relate to a method, wherein setting the temperature at which the tunable laser array operates includes setting the temperature at which each tunable laser of the tunable laser array at least partially overlaps with a respective passband of the optical multiplexer.

In some aspects, the techniques described herein relate to a method, wherein setting the temperature at which each tunable laser of the tunable laser array at least partially overlaps with a respective passband of the optical multiplexer is performed using: a first signal generated by a first photodetector array optically coupled to the tunable laser array, and a second signal generated by a second photodetector array optically coupled to the optical multiplexer.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in the figures in which they appear.

FIGS. 5A, 6A, 7A, 9A and 10A are side views and FIGS. 5B, 6B, 7B, 8, 9B and 10B are top views. In the fabrication step corresponding to FIGS. 5A-5B, thermo-electric coolers (TEC) are bonded to a support. In the fabrication step corresponding to FIGS. 6A-6B, a laser chip is bonded to a TEC. In the fabrication step corresponding to FIGS. 7A-7B, temperature sensors are bonded to the TECs. In the fabrication step corresponding to FIG. 8, a thermal pad is formed on the support in correspondence with an opening defined by a card frame. In the fabrication step corresponding to FIG. 9A-9B, a controller card is mounted to the card frame. In the fabrication step corresponding to FIGS. 10A-10B, a multiplexer chip is bonded to a TEC. In the fabrication step corresponding to FIG. 11, fibers are attached to the multiplexer chip.

DETAILED DESCRIPTION

Figure 1A:
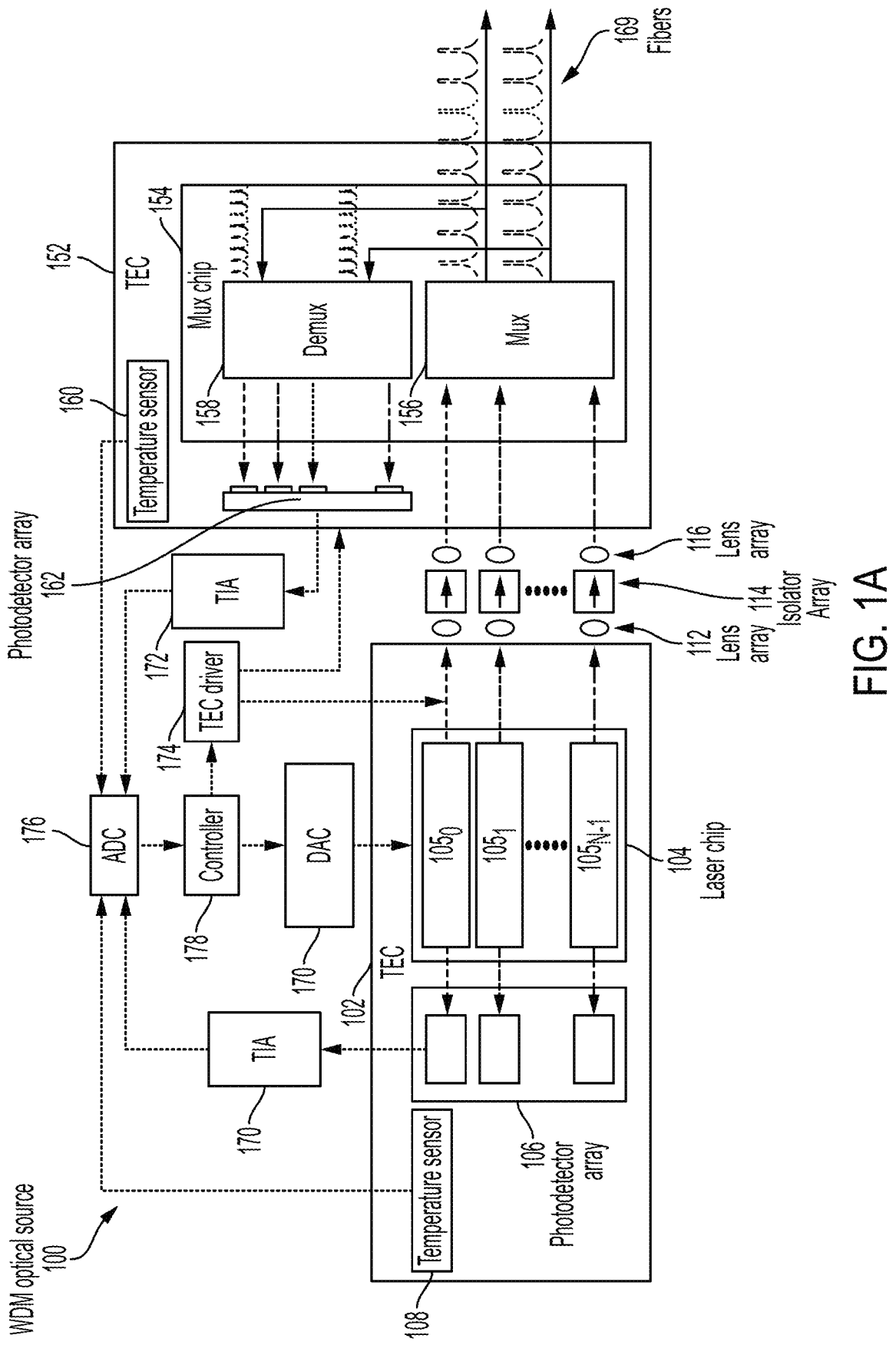
FIG. 1A is a block diagram illustrating an example of a wavelength division multiplexing (WDM) optical source, in accordance with some embodiments.

Described herein are optical sources suitable for use in wavelength division multiplexing (WDM) systems. WDM is a technique in which multiple optical signals, each at a distinct carrier wavelength, are transmitted simultaneously over a single optical medium (e.g., a fiber). By combining wavelength carriers, WDM enables a significant increase in data throughput without the need for additional fibers. This approach is widely used in telecommunications and data center interconnects to maximize bandwidth efficiency and reduce costs.

The optical source developed by the inventors and described herein achieves a high degree of thermal stabilization despite several design constraints. First, the source provides a relatively high level of output power per carrier wavelength, on the order of hundreds of milliwatts (mW) per wavelength. Such high output levels enable use in applications with stringent power budget requirements. Second, the source supports tightly spaced WDM channels (e.g., 200 GHz or even 100 GHz), enabling use of the optical source in applications with stringent bandwidth density requirements. The combination of high power and tight channel spacing poses substantial design challenges. Elevated output power induces localized temperature changes, which in turn can cause unpredictable shifts in emission wavelength. With closely spaced channels, the margin for wavelength drift is extremely small. If a laser drifts into the spectral range of an adjacent channel, significant loss of data can occur.

The inventors have developed packages and techniques aimed at thermal stabilization of WDM optical sources despite the design constraints described above. Thermal stabilization—the process by which the wavelengths of emission of a WDM optical source are stabilized against temperature fluctuations—is achieved by coupling the optical source with a feedback loop that monitors the degree to which the wavelengths of emission conform to the designated WDM channel grid and dynamically adjusts the operating parameters of the source to maintain such conformity.

The feedback loop is designed to compensate for global temperature changes as well as for local temperature changes. A global temperature change may occur because of changing conditions in the surrounding environment, resulting in a temperature change that is substantially uniform across the entire laser chip. Global temperature changes tend to affect all the wavelengths of emission of a source by similar degrees. Local temperature changes, on the other hand, may occur because of a change in the operating conditions of a particular component. Local temperature changes tend to affect the wavelengths of emission of a source by different degrees. For example, one laser may experience a 10 GHz-shift in the emission wavelength while the other lasers may remain largely unaffected. In another example, a first subset of the lasers may experience a red shift while a second subset of the lasers may experience a blue shift. Local temperature changes generally occur over shorter periods of time, while global temperature evolves more slowly.

The techniques developed by the inventors involve a combination of coarse spectral alignment and fine spectral alignment. In general terms, spectral alignment is the process of controlling an optical source to conform the emission wavelengths to the designated WDM channel grid. Coarse spectral alignment involves collectively aligning the emission spectra of multiple tunable lasers to the designated WDM channels. This alignment step is performed in a collective fashion in that the laser spectra of the tunable laser array are shifted in unison (as opposed to being shifted individually). Fine spectral alignment, on the other hand, involves varying the bias applied to each laser on an individual basis. At this stage, each laser is monitored individually. In this way, the wavelength of emission of each laser is controlled to ensure fine alignment with the designated WDM channel.

In some embodiments, an optical source uses a pair of thermo-electric coolers (TEC) to aid in the spectral alignment process. A first TEC is positioned to be thermally coupled to the laser chip. A second TEC is positioned to be thermally coupled to a multiplexer chip—a chip that monitors compliance of the emission wavelengths with the designated WDM grid. The TECs are positioned to allow the system to set the temperature of the laser chip and the temperature of the multiplexer chip independently of one another. As such, the emission wavelengths and the multiplexer channels can be controlled independently.

FIG. 1A is a block diagram illustrating an example of a wavelength division multiplexing (WDM) optical source 100, in accordance with some embodiments. WDM optical source 100 includes a laser chip 104, a multiplexer (mux) chip 154 and thermo-electric coolers (TECs) 102 and 152. Laser chip 104 includes a tunable laser array. Reference numerals $105_0$, $105_0$ . . . $105_{N-1}$ represent the individual tunable lasers of the array. The lasers are said to be tunable in that the carrier wavelength of each laser can be controlled electronically. A carrier wavelength of a WDM channel may be the wavelength positioned in the middle of the wavelength interval of a WDM channel. Alternatively or additionally, a carrier wavelength of a WDM channel may be the wavelength that exhibits the absolute peak intensity within the wavelength interval of a WDM channel. Alternatively or additionally, a carrier wavelength of a WDM channel may be the nominal wavelength of emission of an optical source. The wavelength of emission may be "nominal" in that the optical source may emit a finite spectrum of wavelengths around the nominal wavelength due to spectral broadening effects.

Laser tunability may be achieved using different effects, including through current-based mechanisms and refractive index-based mechanisms. In some embodiments, the lasers may be implemented as distributed-feedback (DFB) lasers or distributed Bragg reflectors (DBR) lasers, though other types of lasers may be used. The source may be configured to emit a relatively high power level per wavelength. High power levels enable use of WDM optical source 100 in applications with stringent power budget requirements. For example, each laser may emit between 50 mW and 300 mW, between 100 mW and 300 mW, between 150 mW and 300 mW, between 200 mW and 300 mW, between 250 mW and 300 mW, between 50 mW and 250 mW, between 100 mW and 250 mW, between 150 mW and 250 mW, between 200 mW and 250 mW, between 50 mW and 200 mW, between 100 mW and 200 mW, between 150 mW and 200 mW, between 50 mW and 150 mW, between 50 mW and 100 mW or between any range within such ranges.

The lasers may be configured to emit in any suitable band, including in the O-band, in the S-band, in the C-band or in the L-band, for example. The nominal spectral spacing between adjacent lasers may be set depending on the requirements of the system connected to WDM optical source 100. The spacing may be 100 GHz, 200 GHz, 400 GHz or any range between those values. The spectral spacing is said to be nominal in that it is subject to temperature fluctuations. Laser chip 104 further includes a photodetector array 106. Each photodetector of array 106 is optically coupled to a respective laser and monitors the spectrum of emission of that laser. The photodetectors may be implemented as photodiodes. In some embodiments, laser chip 104 may be implemented using III-V materials (e.g., on InP substrates). The III-V composition may be chosen depending on the desired emission band.

Mux chip 154 includes a multiplexer 156. Multiplexer 156 aggregates the signals produced by the tunable laser array into one or more output fibers 169. In some embodiments, a first subset of the laser signals is output through a first fiber and a second subset of the laser signals is output through another fiber. The signals may be spectrally interleaved or spectrally contiguous in some embodiments. In one example, a WDM configuration may define the following carrier wavelengths: 1301.47 nm, 1302.6 nm, 1303.73 nm, 1304.87 nm, 1306.01 nm, 1307.14 nm, 1308.28 nm and 1309.43 nm. In a spectrally interleaved scheme, the carrier wavelengths 1301.47 nm, 1303.73 nm, 1306.01 nm and 1308.28 nm may be output by a fiber and the carrier wavelengths 1302.6 nm, 1304.87 nm, 1307.14 nm, and 1309.43 nm may be output by another fiber. In a spectrally contiguous scheme, carrier wavelengths 1301.47 nm, 1302.6 nm, 1303.73 nm, 1304.87 nm may be output by a fiber and carrier wavelengths 1306.01 nm, 1307.14 nm, 1308.28 nm and 1309.43 nm may be output by another fiber. Other schemes are also possible.

Mux chip 154 further includes a demultiplexer (demux) 158. The inputs of demultiplexer 158 are optically coupled to the outputs of multiplexer 158, for example via tap couplers. The tap couplers may direct a small fraction of the power aggregated by multiplexer 156 towards demultiplexer 158. The majority of the power is transmitted through fibers 169. Demultiplexer 158 spectrally separates the received signals. Each spectrally separated signal is transmitted to a photodetector of a photodetector array 162. Photodetector array 162 allows controller 178 to monitor the spectrum of the laser signals upon transmission through multiplexer 156 and demultiplexer 158.

Multiplexer 156 and demultiplexer 158 define spectral channels-distinct, independently usable wavelength bands. Each spectral channel is characterized by a passband spectral response. Wavelengths of light within a particular passband are transmitted, other wavelengths are blocked. Examples of spectral channels are described in connection with FIGS. 4A-4C. In some embodiments, multiplexer 156 and demultiplexer 158 may be designed to exhibit substantially matching spectral responses (although in practice fabrication tolerances may lead to slightly different spectra). As such, multiplexer 156 and demultiplexer 158 are said to define a multiplexer/demultiplexer pair.

In some embodiments, mux chip 154 may be implemented using a material that has a relatively low sensitivity to temperature fluctuations. The material may be chosen on the basis of a relatively low thermo-optic coefficient (indicating small temperature-dependent changes in refractive index). This allows multiplexer 156 and demultiplexer 158 to have spectral responses that are generally insensitive to temperature fluctuations. For example, mux chip 154 may be a planar lightwave circuit (PLC); as such, multiplexer 156 and demultiplexer 158 may be made of silicon dioxide (with the core and cladding having slightly different doping levels to produce a refractive index contrast). The drawback of using PLCs is that PLCs do not allow for electric control of the multiplexer/demultiplexer (unlike multiplexer/demultiplexer implemented using silicon photonics).

TECs 102 and 152 are modules that enable precise temperature control by pumping heat from one side of the module to the other when electric current flows through them. In some embodiments, TECs 102 and 152 are implemented as solid-state devices that transfer heat using the Peltier effect. Laser chip 104 is mounted on TEC 102; as such, TEC 102 can be controlled to cool or heat laser chip 104. Similarly, mux chip 154 is mounted on TEC 152; as such, TEC 152 can be controlled to cool or heat mux chip 154.

In some embodiments, WDM optical source 100 uses temperature sensors to allow the TECs to accurately set the temperature of the respective chips. Temperature sensor 108 is thermally coupled to TEC 102 and temperature sensor 160 is thermally coupled to TEC 152. The output signals of the temperature sensors are representative of the temperature of the TECs. A controller 178 uses the output signal of the temperature sensors to set the temperature of the TECs to a desired value. As described in detail further below, changing the temperature of TEC 102 results in a change in the spectrum of emission of the tunable laser array. Similarly, changing the temperature of TEC 152 results in a change in the spectral response of mux 156 and demux 158 (though to a lesser extent in embodiments in which mux 152 is a PLC).

In some embodiments, the tunable laser array is optically coupled to mux 156 through isolator array 114. The isolators prevent back reflections arising outside laser chip 104 from coupling back into laser chip 104, thus safeguarding the integrity of the tunable lasers. Isolator array 114 may be implemented using free space optics components, fiber-based components or PIC-based components. When implemented using free space optics components, a first lens array 112 may be used to focus light on the isolators and a second lens array 116 may be used to shape the outputs beams for coupling to mux chip 154. In some embodiments, implementing isolators using free space optics components is preferable over fiber-based components because free space optics components tend to be more compact.

Trans-impedance amplifiers (TIAs) 170 and 172 are configured to generate voltages upon receiving photocurrents from photodetector arrays 106 and 162, respectively. Analog-to-digital converter (ADC) 176 digitizes analog signals received from TIAs 170 and 172 and from temperature sensors 108 and 160. The digital outputs are provided as inputs to controller 178. Controller 178 controls TECs 102 and 104 using TEC driver 174 based on the information received from the temperature sensors and the photodetector arrays. Additionally, controller 178 controls the tunable laser array using digital-to-analog converter (DAC) 170 based on the information received from the temperature sensors and the photodetector arrays. Controller 178 may be implemented using one or more processors, one or more applications-specific integrated circuits and any other suitable type of digital circuitry.

Figure 1B:
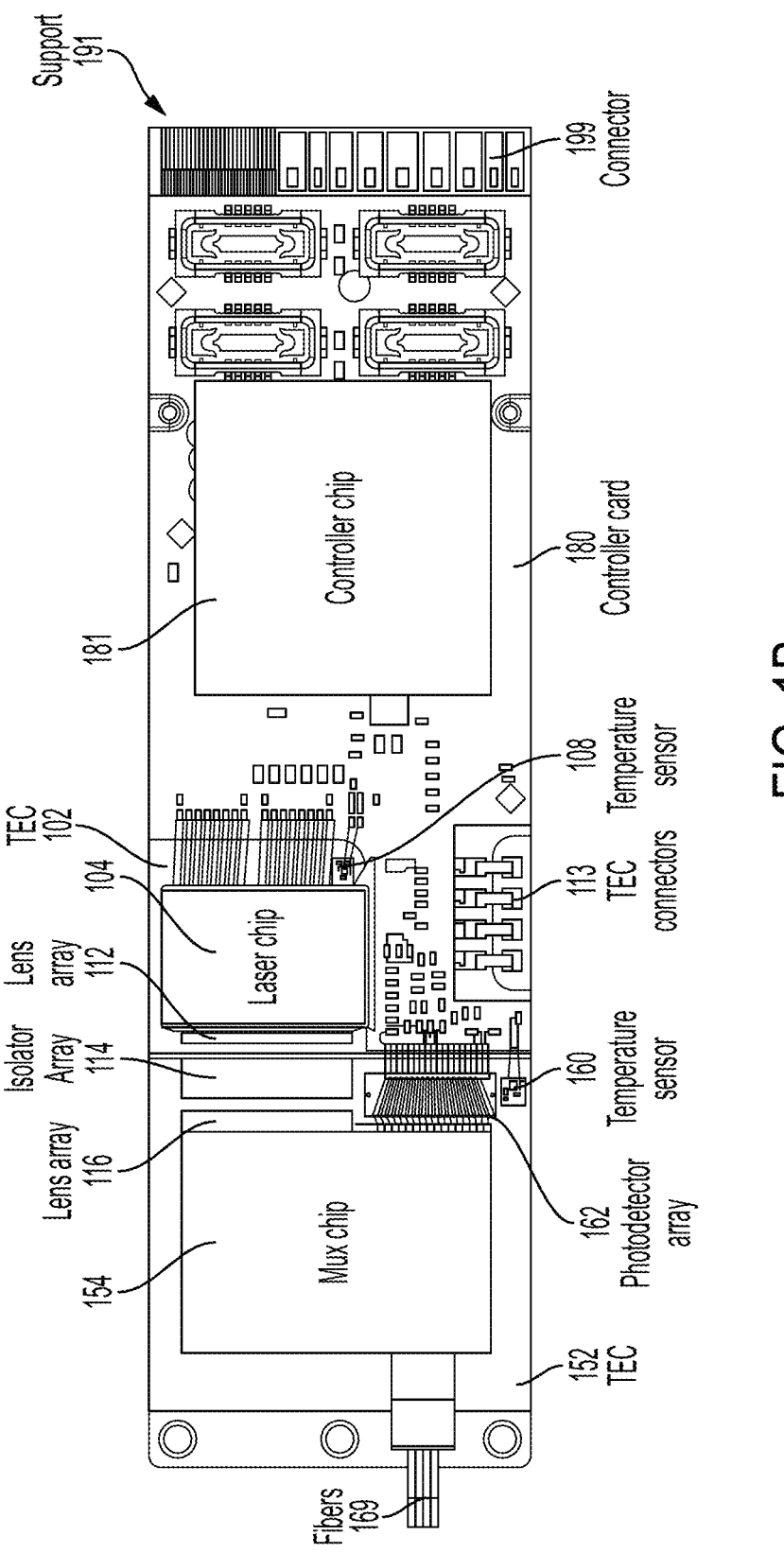
FIG. 1B is a top view of an example of a WDM optical source, in accordance with some embodiments.
Figure 1C:
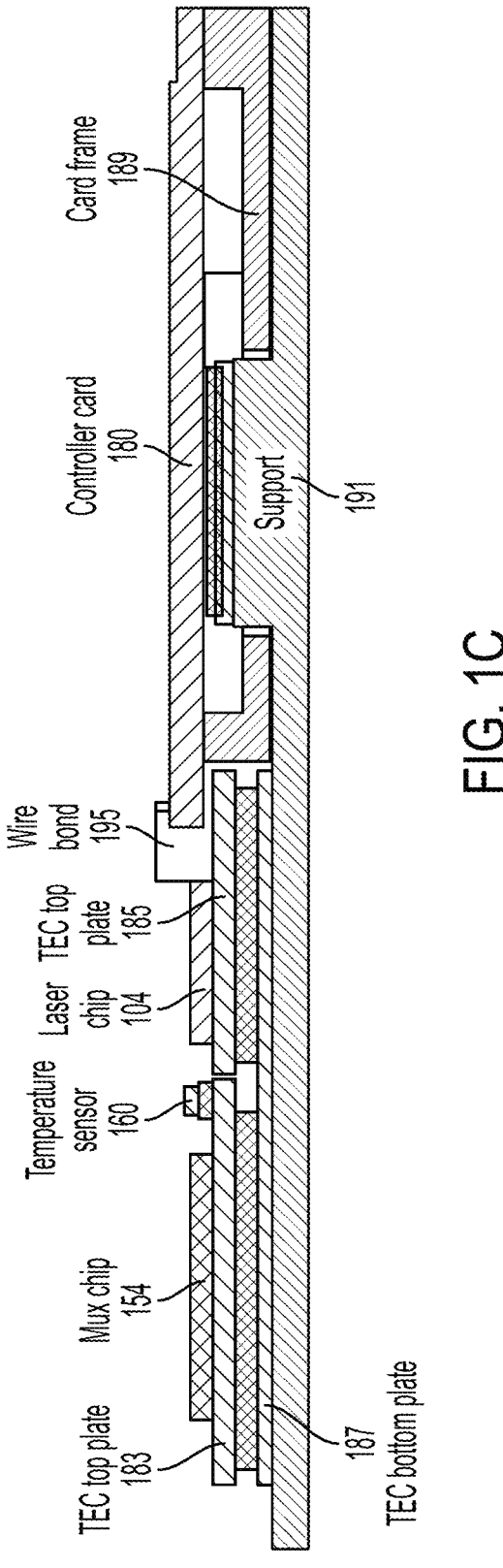
FIG. 1C is a side view of the WDM optical source of FIG. 1B, in accordance with some embodiments.

In some embodiments, the WDM optical source of FIG. 1A may be implemented as depicted in FIGS. 1B-1C, although not all embodiments are limited to this particular implementation. FIG. 1B illustrates a top view of the example implementation and FIG. 1C illustrates a side view. The components of WDM optical source 100 are mounted on a support 191, which in some embodiments defines (or is part of) a printed circuit board. Connector 199 is configured to electrically connect support 191 to another circuit board (e.g., is inserted into the socket of a motherboard). In this example, controller 178, ADC 176, DAC 170, TIAs 170 and 172 and TEC driver 174 are implemented as part of a controller chip 181 mounted on a controller card 180. Controller card 180 is disposed on (e.g., mounted on) a card frame 189.

As shown in FIG. 1C, TECs 102 and 152 share a common TEC bottom plate 187 and have separate TEC top plates. TEC 152 includes TEC top plate 183 and TEC 102 includes TEC top plate 185. In some embodiments, the use of a common plate enables operation of the TECs without the need for a relative calibration between them. By providing a uniform thermal interface, the common plate ensures consistent performance across the TECs, thereby eliminating the need for periodic calibration steps to account for variations between the TECs.

Temperature sensor 160 and mux chip 154 are mounted on TEC top plate 183; temperature sensor 108 and laser chip 104 are mounted on TEC top plate 185. Wire bonds connect controller card 180 to laser chip 104. As shown in FIG. 1B, lens array 112, isolator array 114 and lens array 116 are disposed between laser chips 104 and mux chip 154. Fibers 169 are connected to mux chip 105, at the opposite end of support 191 relative to connector 199. TEC connectors 113 provide an electrical interface to TECs 102 and 152.

Figure 2:
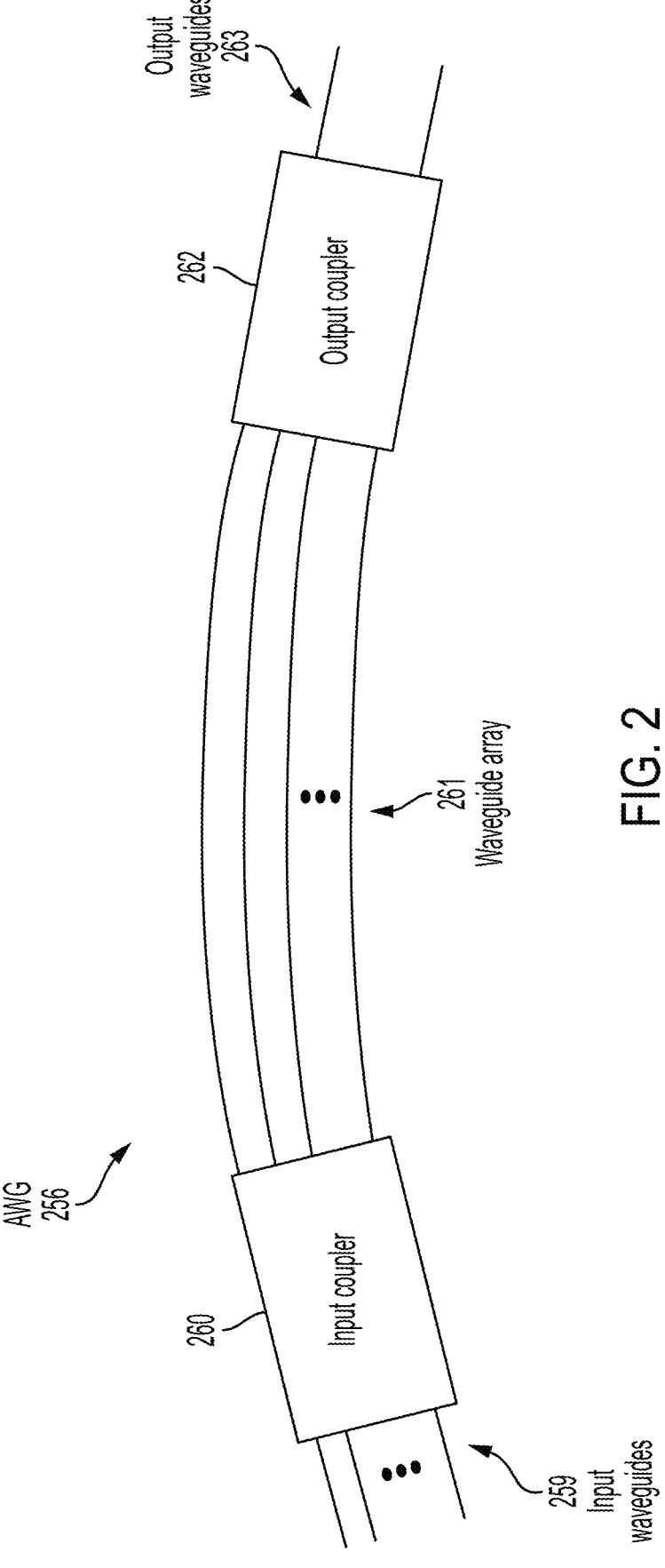
FIG. 2 is a top view of an arrayed waveguide grating (AWG) that may be used to implement the multiplexer and/or the demultiplexer of FIG. 1A, in accordance with some embodiments.

Multiplexer 156 and demultiplexer 158 may be implemented using various types of photonic components, including using banks of resonant filters (e.g., ring resonators) or Mach-Zehnder interferometers (MZI). Alternatively, multiplexer 156 and demultiplexer 158 may be implemented using arrayed waveguide gratings (AWG), an example of which is shown in FIG. 2. AWG 256 includes input waveguides 259, an intermediate waveguide array 161 and output waveguides 263. Input coupler 260 couples input waveguides 259 to waveguide array 261. Output coupler 262 couples waveguide array 261 to output waveguides 263. Input coupler 260 and output coupler 262 may be implemented using multimode interferometers (MMI). AWG 256 operates by exploiting the principle of wavelength-dependent constructive and destructive interference, which is enabled by designing the waveguides of array 261 with incrementally different lengths. The length difference between adjacent waveguides introduces a fixed phase delay between the light signals emerging from them. This phase delay is wavelength-dependent: light at one wavelength will experience constructive interference in one output channel, while light at another wavelength will interfere constructively in a different output channel. The interference pattern directs each wavelength to a specific output waveguide. AWG 256 is shown as being implemented as a multiplexer. An analogous demultiplexer may be implemented by swapping the input waveguides with the output waveguides (i.e., by using output waveguides 263 as inputs and input waveguides 259 as outputs).

Some embodiments are directed to methods for controlling a WDM optical source. The methods are aimed at stabilizing the spectral output of the tunable laser array against thermal fluctuations, which may arise either as a result of a global temperature change (a temperature change affecting all the lasers of an array equally) or a local temperature change (a temperature change affecting different lasers to different extents). A global temperature change may occur because of a change in the temperature of the surrounding environment; a local temperature change may occur because of a change in the temperature of a particular component (e.g., a particular laser may overheat more than others).

Figure 3A:
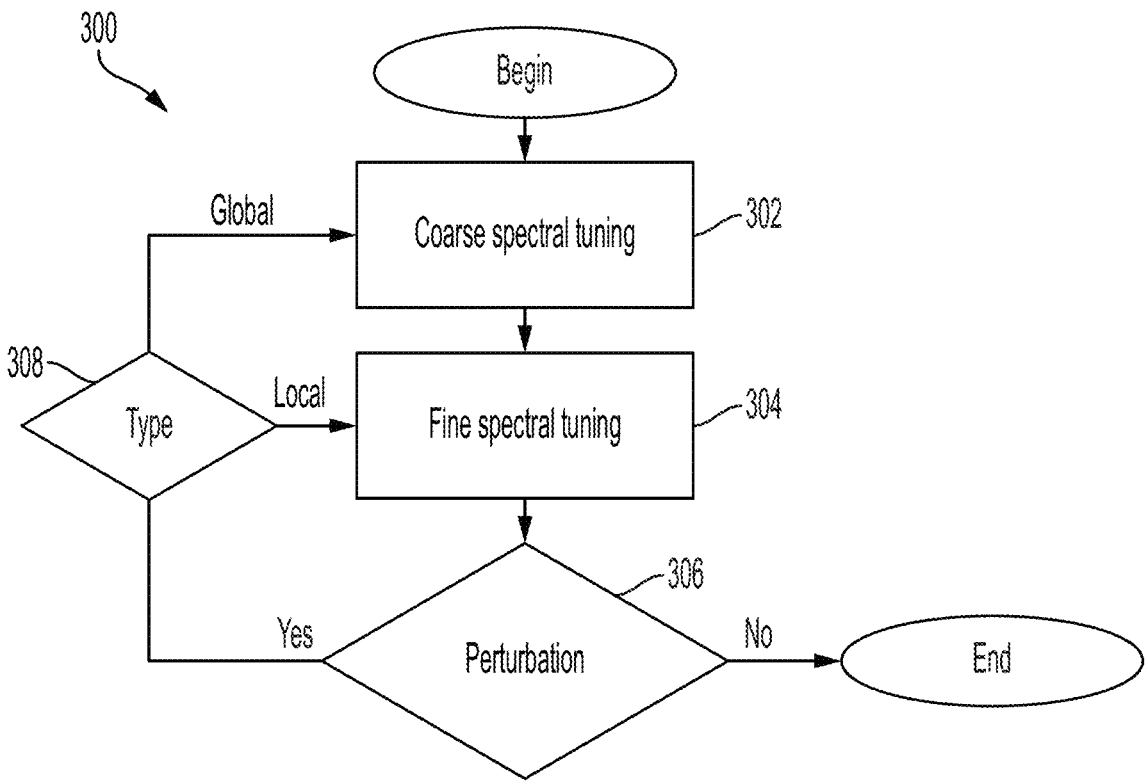
FIG. 3A is a flow chart illustrating a method for controlling a WDM laser, in accordance with some embodiments.
Figure 3B:
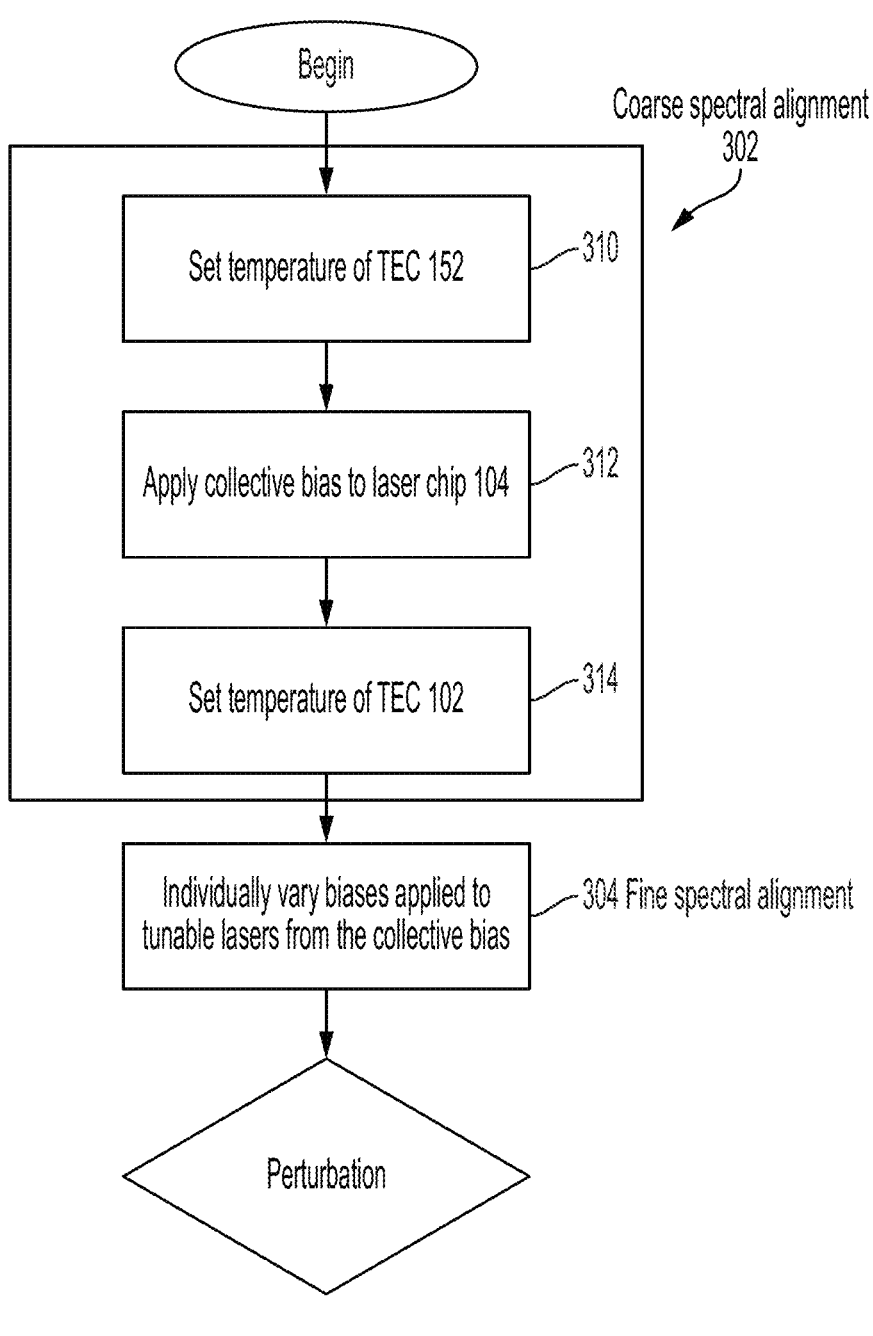
FIG. 3B is a flow chart illustrating steps of the method of FIG. 3A in additional detail, in accordance with some embodiments.
Figures 4A, 4B, 4C:
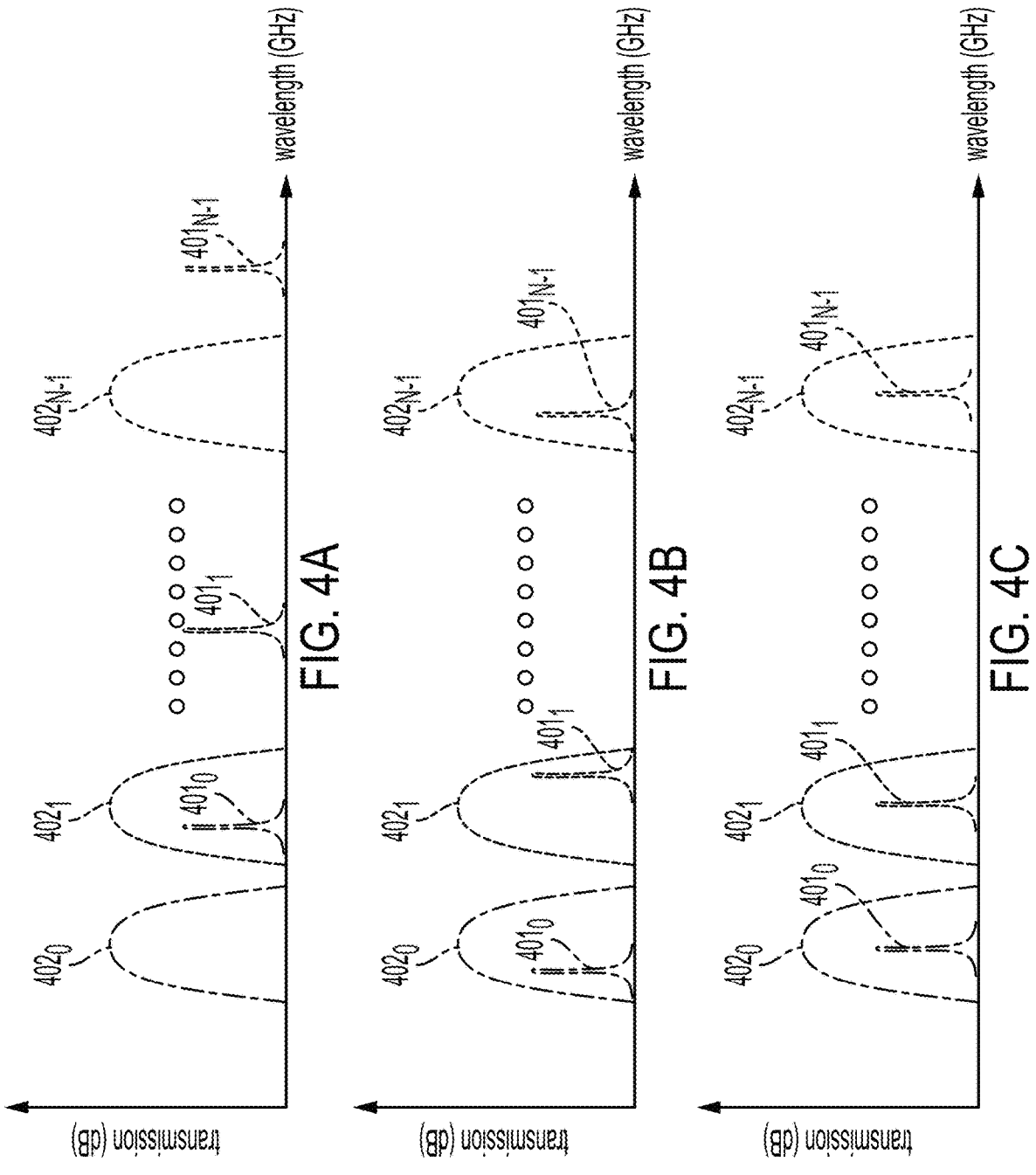
FIG. 4A is a diagram illustrating the spectrum produced by a tunable laser array in relationship with the spectrum of a multiplexer prior to coarse spectral alignment, in accordance with some embodiments.
FIG. 4B is a diagram illustrating the spectrum produced by a tunable laser array in relationship with the spectrum of a multiplexer following coarse spectral alignment but prior to fine spectral alignment, in accordance with some embodiments.
FIG. 4C is a diagram illustrating the spectrum produced by a tunable laser array in relationship with the spectrum of a multiplexer following fine spectral alignment, in accordance with some embodiments.

FIGS. 3A-3B are flowcharts illustrating a method for controlling a WDM optical source. The WDM optical source to be controlled with this method may be implemented as shown in FIG. 1A, or in accordance with other schemes. FIGS. 3A-3B are described in conjunction with FIGS. 4A-4C, illustrating the spectra of tunable lasers superimposed with the passbands associated with a multiplexer/demultiplexer pair.

Method 300 begins at step 302, in which coarse spectral alignment is performed. Coarse spectral alignment involves collectively aligning the emission spectra of the tunable lasers to the spectral passbands associated with a multiplexer/demultiplexer pair. This alignment step is performed in a collective fashion in that the laser spectra of the tunable laser array are shifted in unison (as opposed to being shifted individually). The effect of this step is illustrated by comparing FIG. 4A with FIG. 4B. FIG. 4A illustrates the relative positioning of the emission spectra of the tunable lasers relative to the passbands associated with the multiplexer/demultiplexer pair before the beginning of method 300. Reference numerals $401_0$, $401_1$ . . . $401_{N-1}$ represent the emission spectra of tunable lasers $105_0$, $105_1$ . . . $105_{N-1}$, for example. Reference numerals $402_0$, $402_1$ . . . $402_{N-1}$ represent the passbands associated with the various channels defined by the multiplexer 156/demultiplexer 158 pair. At this stage, spectra $401_0$, $401_1$ . . . $401_{N-1}$ are misaligned from passbands $402_0$, $402_1$ . . . $402_{N-1}$. FIG. 4B is a diagram illustrating the spectrum produced by a tunable laser array in relationship with the spectrum of a multiplexer following coarse spectral alignment but prior to fine spectral alignment.

In performing coarse spectral alignment 302, method 300 shifts spectra $401_0$, $401_1$ . . . $401_{N-1}$ in unison until each spectrum 401 is coarsely aligned with a respective passband 402. Photodetector array 162 monitors whether, and the extent to which, the spectra are aligned with the passbands. The state of "coarse alignment" is achieved when the spectra of each laser at least partially overlaps with a respective passband. Some spectra may be aligned with respective passbands more closely than others, as can be appreciated from FIG. 4B. Further details on how coarse spectral alignment 302 may be implemented in practice are described in connection with FIG. 3B.

Method 300 then proceeds to step 304, in which fine spectral alignment is performed. Fine spectral alignment involves individually aligning the emission spectra of the tunable lasers to the associated passbands. At step 304, each laser is tuned independently of the others (e.g., through DAC 170). The effect of this step is illustrated by comparing FIG. 4B with FIG. 4C (illustrating the spectrum produced by a tunable laser array in relationship with the spectrum of a multiplexer following fine spectral alignment).

In performing fine spectral alignment 304, method 300 tunes each spectrum 401 individually until each spectrum 401 is finely aligned with a passband 402. Again, photodetector array 162 monitors the extent to which each spectrum is finely aligned with the associated passband. In some embodiments, the state of "fine alignment" is achieved when the output of each photodetector of array 162 is maximized. Alternatively, the state of "fine alignment" is achieved when the output of each photodetector of array 162 is above a predefined threshold. Alternatively, the state of "fine alignment" is achieved when the outputs of the photodetectors of array 162 are within a predefined range. Other criteria may be used to assess whether fine alignment has been reached.

Referring back to FIG. 3A, as the system undergoes perturbations altering the spectral alignment depicted in FIG. 4C, method 300 continues to perform spectral alignment (step 306). Depending on the type of perturbation, method 300 may return to step 302 (if the perturbation is in the form of a global temperature change) or to step 304 (if the perturbation is in the form of a local temperature change). The determination of whether the temperature change is global or local (at step 308) may be performed by monitoring the outputs of photodetector array 162. Where all the photodetectors of array 162 register a misalignment between the laser spectra and the respective passbands, the system may determine that a global temperature change has occurred. However, where only a subset of the photodetectors of array 162 register a misalignment between the laser spectra and the respective passbands, the system may determine that a local temperature change has occurred.

FIG. 3B is a flowchart illustrating steps performed as part of coarse spectral alignment 302 and fine spectral alignment 304, in accordance with some embodiments. Coarse spectral alignment 302 involves steps 310, 312 and 314, which may be performed in the order depicted in FIG. 3B or in any suitable order. At step 310, controller 178 sets the temperature of TEC 152, thereby setting the temperature at which mux chip 154 operates. Controller 178 may select the set temperature based on the specifications of mux 156 and demux 158. For example, mux 156 and demux 158 may exhibit a certain temperature range at which their spectral responses are relatively insensitive to temperature fluctuations. Controller 178 may select the set temperature to be within this range. Alternatively, controller 178 may select the set temperature to match the passbands of mux 156 and demux 158 to a predefined WDM grid. Controller 178 uses the signal generated by temperature sensor 160 to guide the process of setting the temperature of TEC 152 as part of a feedback loop.

At step 312, controller 178 applies a collective bias to laser chip 104. The bias may be applied by controlling DAC 170 to produce bias currents for the lasers. As a result, the lasers of array 104 begin to emit light. The bias applied to array 104 is said to be "collective" to indicate that, at this stage, each laser is driven with current value without attempting to optimize the performance of individual lasers. For example, controller 178 may supply each laser with a current corresponding to its nominal carrier wavelength. In another example, each laser is driven with the same amount of current. In the subsequent fine spectral alignment stage, the biasing is adjusted on a per-laser basis to achieve individual optimization.

At step 314, controller 178 sets the temperature of TEC 102, thereby setting the temperature at which laser chip 104 operates. Controller 178 may select the set temperature to achieve coarse spectral alignment between the tunable laser array and the passbands of the optical mux, as described in connection with FIG. 4B. To achieve coarse spectral alignment, controller 178 uses the signals generated photodetector array 106 and photodetector array 162. By comparing the signals generated by the photodetector arrays, controller 178 can monitor the overall alignment between the laser array and the multiplexer channels.

Fine spectral alignment 304 involves varying the biases applied to the tunable lasers from the collective bias on an individual basis. At this stage, each laser is monitored individually. By varying the bias applied to each laser, controller 178 can fine tune the wavelength of emission of each laser to ensure fine alignment with the respective multiplexer channels.

FIGS. 5A-5B, 6A-6B, 7A-7B, 8, 9A-9B, 10A-10B and 11 illustrate steps of a method for assembling a WDM optical source, in accordance with some embodiments. FIGS. 5A, 6A, 7A, 9A and 10A are side views corresponding to the top views of FIGS. 5B, 6B, 7B, 9B and 10B, respectively.

Figures 5A, 5B:
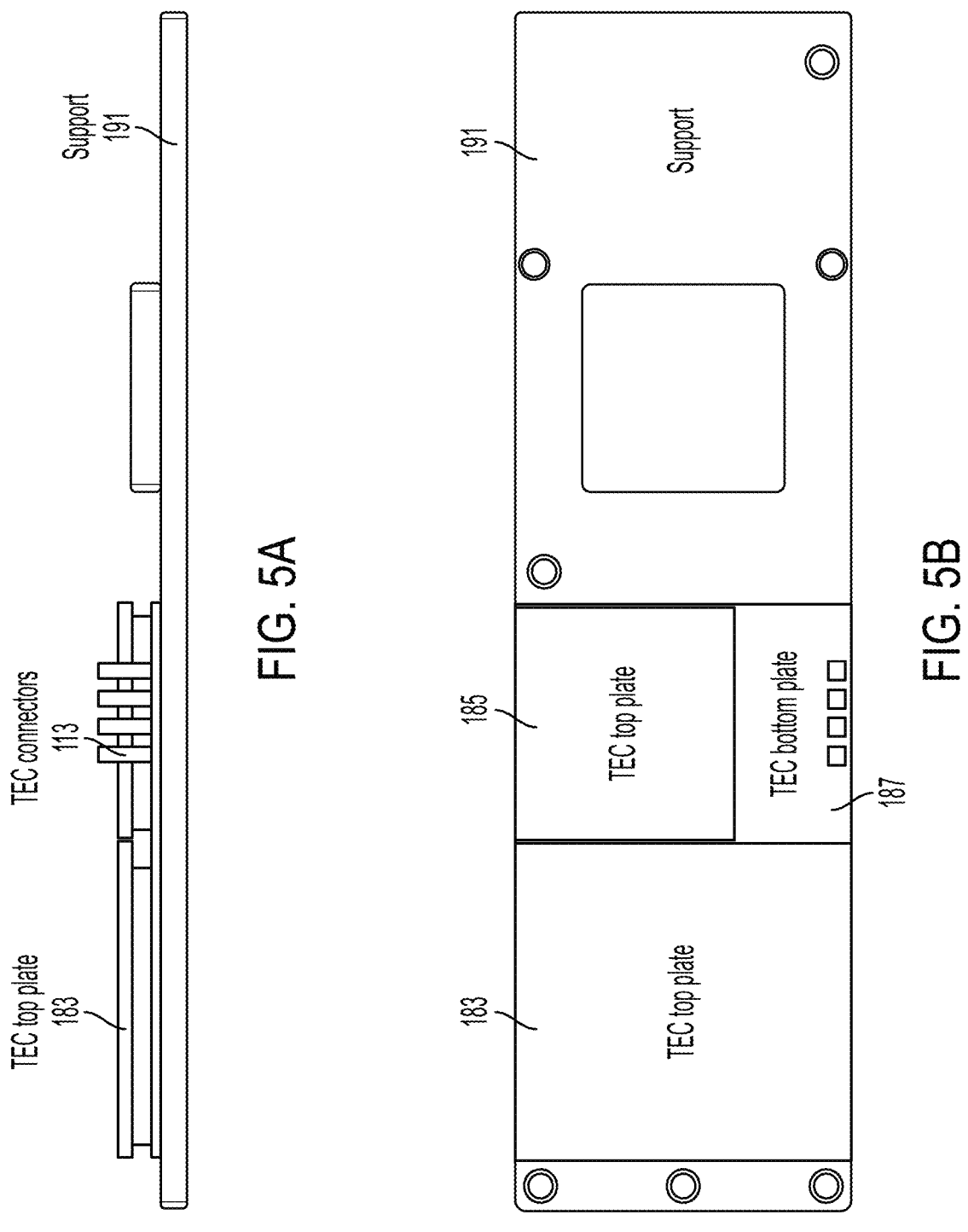
FIGS. 5A-5B, 6A-6B, 7A-7B, 8, 9A-9B, 10A-10B and 11 illustrate steps of a method for assembling a WDM optical source, in accordance with some embodiments.

In the fabrication step corresponding to FIGS. 5A-5B, the TECs 102 and 152 are bonded to support 191. For example, the TECs 102 and 152 may be bonded to support 191 using silver epoxy, although other materials may be used. Once the bonding is completed, TEC top plates 183 and 185 are positioned over TEC bottom plate 187, as can be appreciated from FIGS. 5A-5B. TEC connections 113 may be attached to the TECs at this stage.

Figures 6A, 6B:
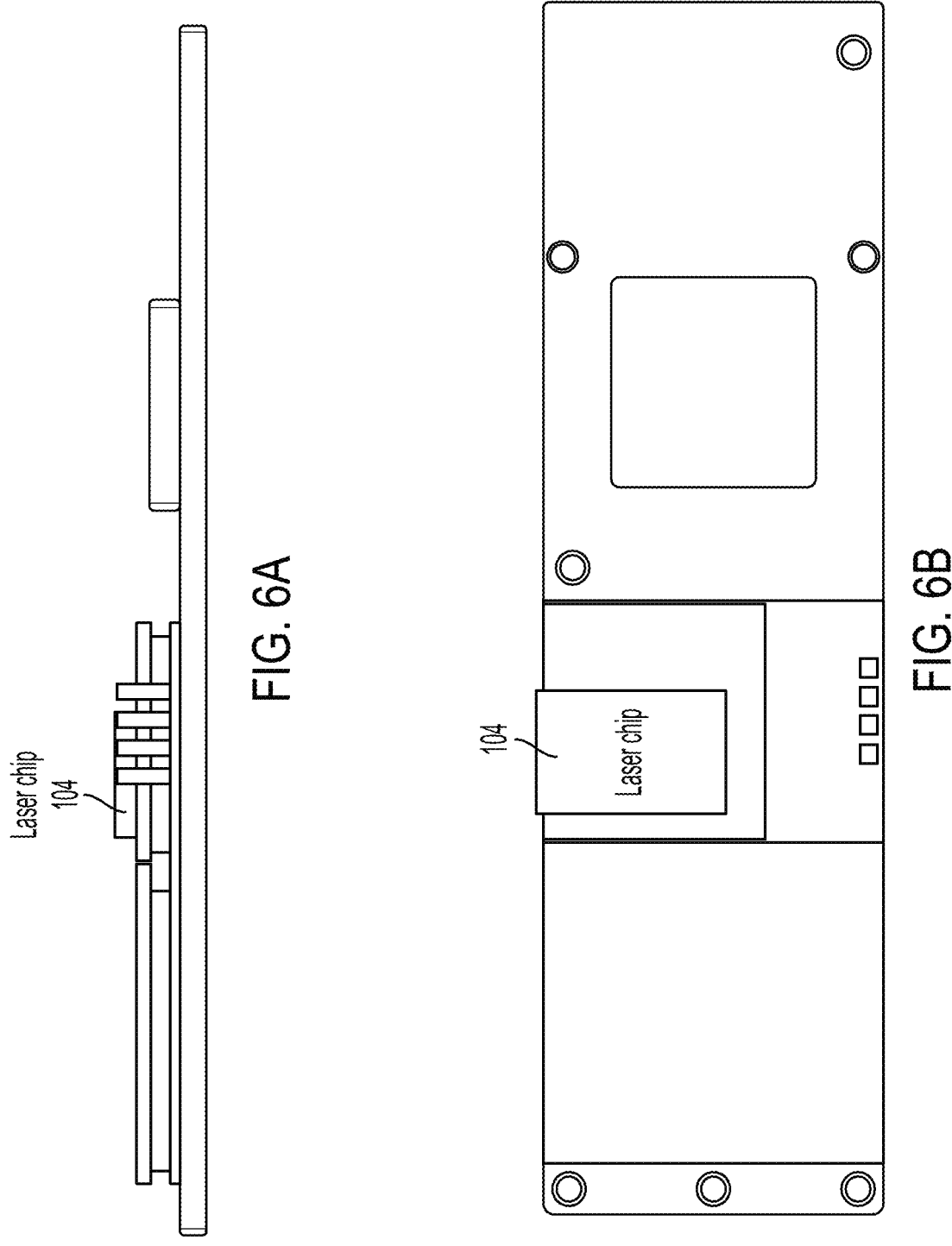

In the fabrication step corresponding to FIGS. 6A-6B, laser chip 104 is bonded to TEC 102, for example using silver epoxy.

Figures 7A, 7B:
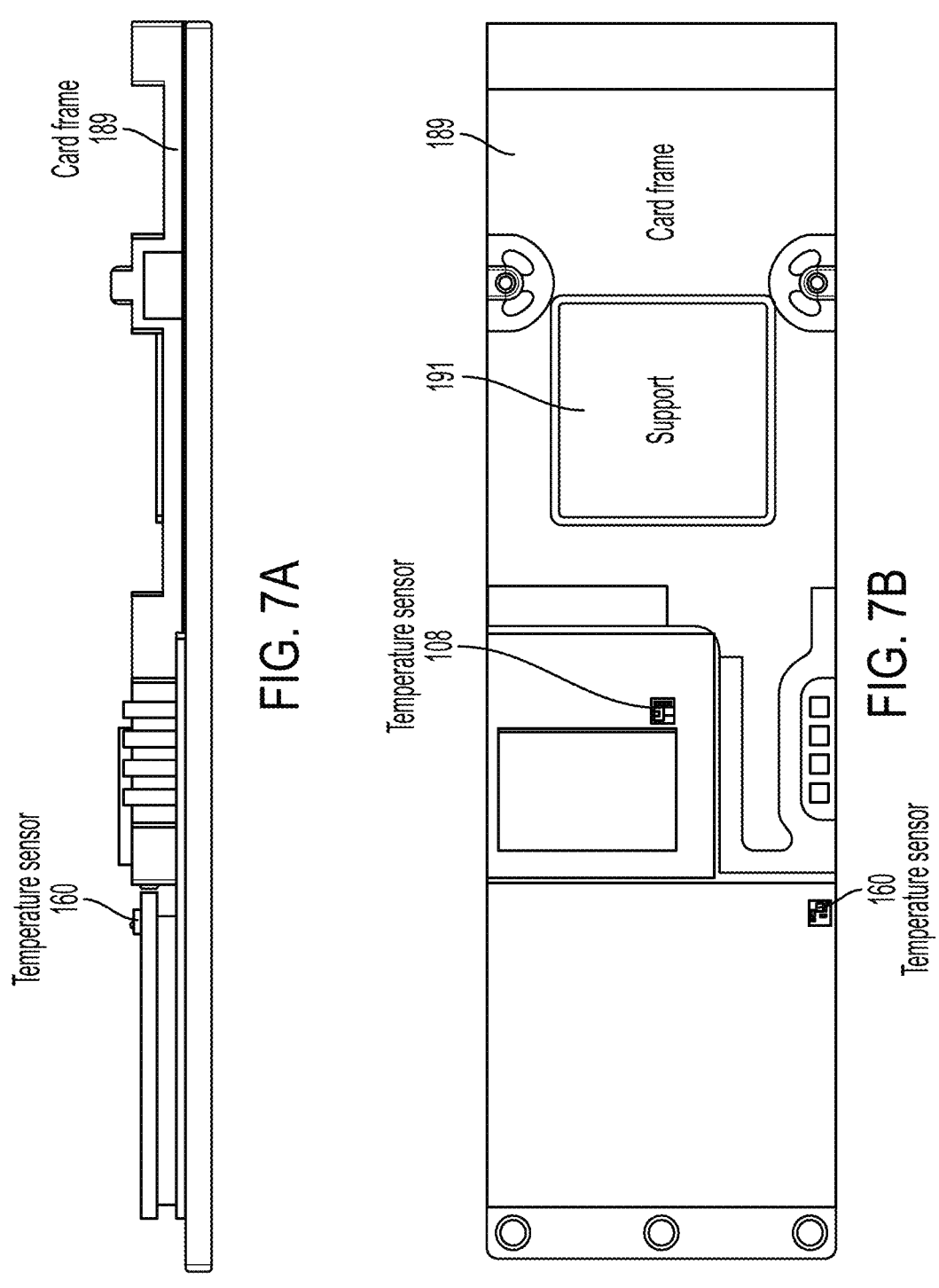

In the fabrication step corresponding to FIGS. 7A-7B, temperature sensor 108 is bonded to TEC 102 and temperature sensor 160 is bonded to TCE 152, for example using silver epoxy. Additionally, card frame 189 may be bonded to support 191, for example using epoxy. Card frame 189 is shaped to support controller card 180 thereon, as discussed further below. Card frame 189 may define an opening therethrough, thereby leaving a portion of support 191 exposed, as can be appreciated from FIG. 7B.

Figure 8:
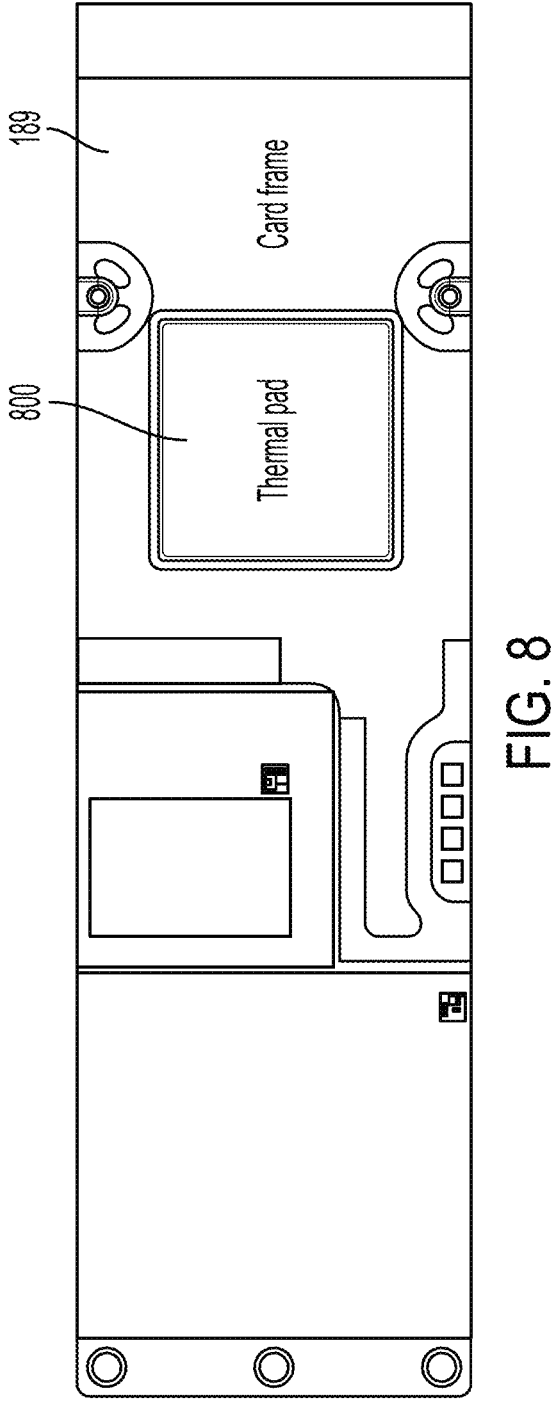
Figures 9A, 9B:
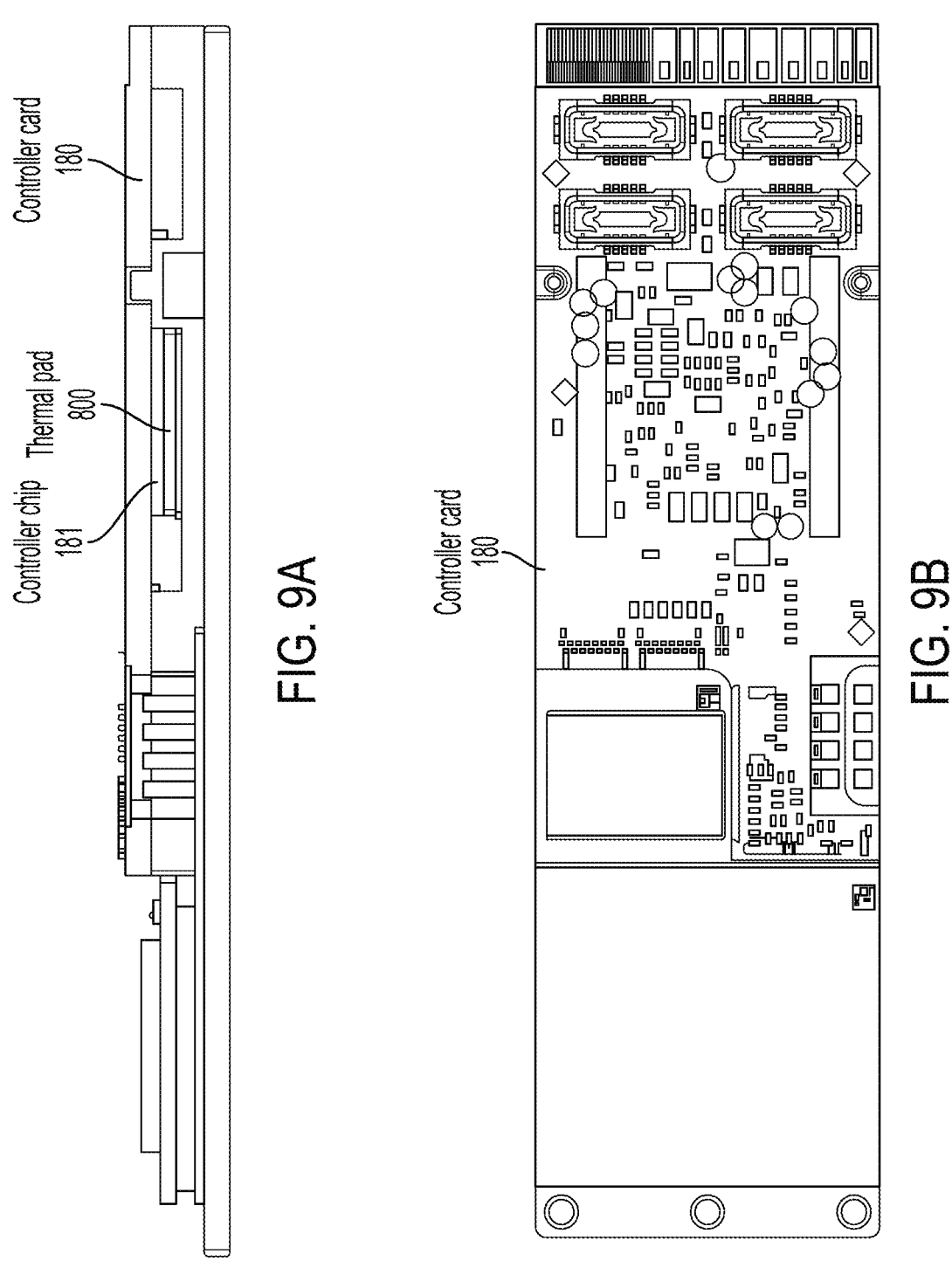

In the fabrication step corresponding to FIG. 8, a thermal pad 800 is formed on support 191 in correspondence with the opening defined by card frame 189. Thermal pad 800 may be made of a thermally conductive material. In the fabrication step corresponding to FIG. 9A-9B, controller card 180 (with controller chip 181 mounted thereon) is mounted to card frame 189. A portion of the bottom side of controller card 180 is placed in contact with thermal pad 800. Thermal pad 800 permits passage of heat generated within controller card 180, thereby allowing the heat to dissipate in the support 191.

Figures 10A, 10B:
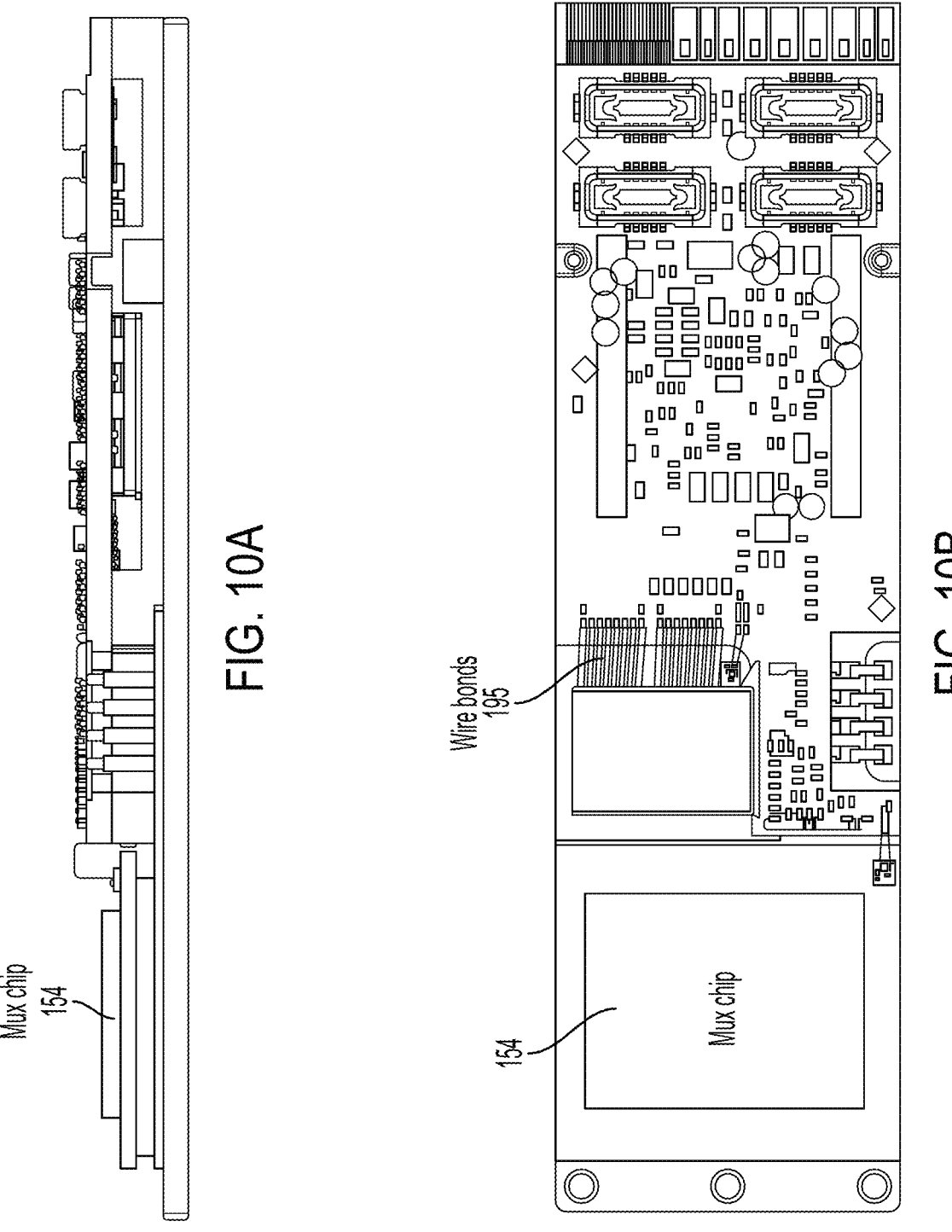

In the fabrication step corresponding to FIGS. 10A-10B, mux chip 154 is bonded to TEC 152, for example using epoxy. Additionally, wire bonds 195 are formed, connecting controller card 180 to laser chip 104.

Figure 11:
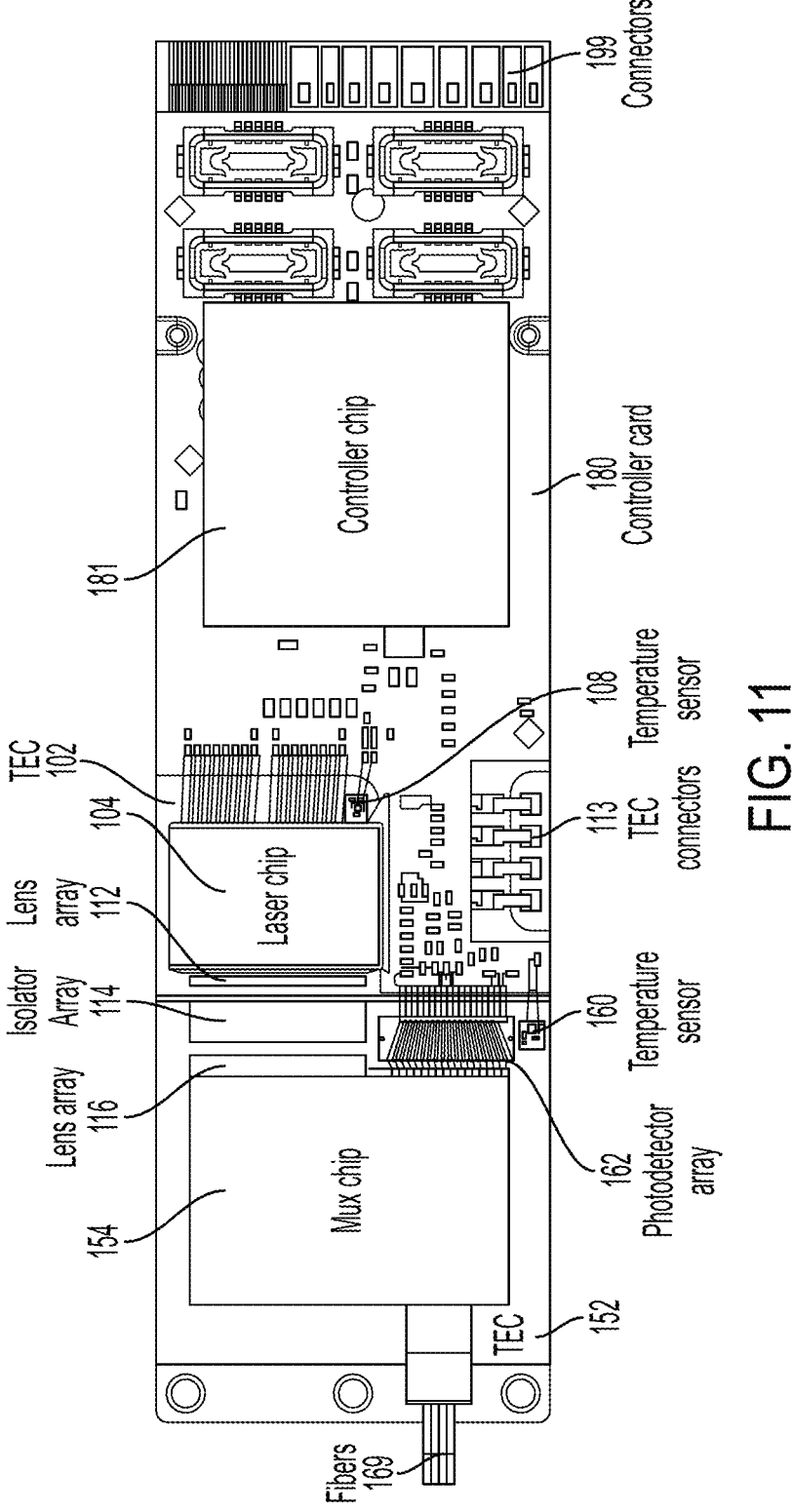

Lastly, in the fabrication step corresponding to FIG. 11, fibers 169 are attached to mux chip 154. Additionally, isolator array 114 and lens arrays 112 and 116 are bonded to TEC 152, for example using epoxy. In bonding isolator array 114 and lens arrays 112 and 116 to TEC 152, the arrays are optically aligned to one another to ensure optical coupling from laser chip 104 to mux chip 154. Additionally, photodetector arrays 106 (not shown in FIG. 11) and 162 are mounted on the respective TECs, for example using silver epoxy.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than described, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A wavelength division multiplexing (WDM) optical source, comprising:

a support;

a first thermo-electric cooler (TEC) and a second TEC, wherein the first and second TECs are mounted on the support;

a first chip comprising a tunable laser array, wherein the first chip is thermally coupled to the first TEC;

a second chip comprising an optical multiplexer, wherein the second chip is thermally coupled to the second TEC, wherein the tunable laser array is optically coupled to the optical multiplexer;

a first photodetector array optically coupled to the first chip and a second photodetector array optically coupled to the second chip; and a controller configured to control the first TEC using a first signal generated by the first photodetector array and a second signal generated by the second photodetector array.

2. The WDM optical source of claim 1, wherein the second chip further comprises an optical demultiplexer, an output of the optical multiplexer being optically coupled to an input of the optical demultiplexer.

3. The WDM optical source of claim 2, wherein the second photodetector array is coupled to outputs of the optical demultiplexer.

4. The WDM optical source of claim 1, further comprising a first temperature sensor thermally coupled to the first TEC and a second temperature sensor thermally coupled to the second TEC.

5. The WDM optical source of claim 1, further comprising:

a first temperature sensor thermally coupled to the second TEC;

wherein the controller is further configured to:

control the second TEC using a third signal generated by the first temperature sensor.

6. The WDM optical source of claim 5, further comprising a second temperature sensor thermally coupled to the first TEC, wherein controlling the first TEC is further performed using a fourth signal generated by the second temperature sensor.

7. The WDM optical source of claim 5, wherein the controller is further configured to:

subsequent to controlling the first TEC and the second TEC, controlling the tunable laser array based on the second signal.

8. The WDM optical source of claim 1, wherein the first and second TECs share a common TEC plate.

9. The WDM optical source of claim 8, wherein the common TEC plate is a bottom plate mounted to the support, wherein the first TEC comprises a first top plate and the second TEC comprises a second top plate, wherein the first chip is mounted to the first top plate and the second chip is mounted to the second top plate.

10. The WDM optical source of claim 1, wherein the second chip comprises a planar lightwave circuit (PLC) and the optical multiplexer is made of silicon dioxide.

11. The WDM optical source of claim 1, wherein the tunable laser array is optically coupled to the optical multiplexer through an isolator array.

12. A wavelength division multiplexing (WDM) optical source, comprising:

a support;

a first chip comprising a tunable laser array, wherein the first chip is mounted to the support;

a second chip comprising an optical multiplexer, wherein the second chip is mounted to the support, wherein the tunable laser array is optically coupled to the optical multiplexer; and a controller coupled to the first and second chips, wherein the controller is configured to:

perform coarse spectral alignment between the tunable laser array and the optical multiplexer, wherein performing the coarse spectral alignment comprises:

setting a temperature at which the optical multiplexer operates by controlling a first thermo-electric cooler (TEC) thermally coupled to the optical multiplexer, applying a collective bias to the tunable laser array, and setting a temperature at which the tunable laser array operates by controlling a second TEC thermally coupled to the tunable laser array, and subsequent to performing the coarse spectral alignment, perform fine spectral alignment between the tunable laser array and the optical multiplexer.

13. The WDM optical source of claim 12, wherein setting the temperature at which the tunable laser array operates comprises setting the temperature at which each tunable laser of the tunable laser array at least partially overlaps with a respective passband of the optical multiplexer.

14. The WDM optical source of claim 13, wherein setting the temperature at which each tunable laser of the tunable laser array at least partially overlaps with a respective passband of the optical multiplexer is performed using:

a first signal generated by a first photodetector array optically coupled to the tunable laser array, and a second signal generated by a second photodetector array optically coupled to the optical multiplexer.

15. The WDM optical source of claim 12, wherein performing the fine spectral alignment comprises individually varying a bias applied to at least one tunable laser of the tunable laser array from the collective bias.

16. The WDM optical source of claim 12, wherein the second chip further comprises:

an optical demultiplexer, an output of the optical multiplexer being optically coupled to an input of the optical demultiplexer; and a photodetector array coupled to outputs of the optical demultiplexer.

17. The WDM optical source of claim 12, further comprising a first temperature sensor thermally coupled to the first TEC and a second temperature sensor thermally coupled to the second TEC.

18. The WDM optical source of claim 17, wherein:

controlling the first TEC is performed using a first signal generated by the first temperature sensor, and controlling the second TEC is performed using a second signal generated by the second temperature sensor.

19. A method for controlling a wavelength division multiplexing (WDM) optical source, the method comprising:

performing coarse spectral alignment between a tunable laser array and an optical multiplexer, wherein performing the coarse spectral alignment comprises:

setting a temperature at which the optical multiplexer operates using a first signal generated by a first photodetector array, coupled to the tunable laser array, and a second signal generated by a second photodetector array, coupled to the optical multiplexer, applying a collective bias to the tunable laser array, and setting a temperature at which the tunable laser array operates; and subsequent to performing the coarse spectral alignment, performing fine spectral alignment between the tunable laser array and the optical multiplexer, wherein performing the fine spectral alignment comprises individually varying biases applied to tunable lasers of the tunable laser array from the collective bias.

20. The method of claim 19, wherein setting the temperature at which the tunable laser array operates comprises setting the temperature at which each tunable laser of the tunable laser array at least partially overlaps with a respective passband of the optical multiplexer.

* * * * *